United States Patent
Cook et al.

(10) Patent No.: US 6,771,275 B1
(45) Date of Patent: Aug. 3, 2004

(54) PROCESSING SYSTEM AND METHOD USING A MULTI-DIMENSIONAL LOOK-UP TABLE

(75) Inventors: Craig C. Cook, Wayland, MA (US); Steven J. Pratt, Acton, MA (US); Fred W. Andree, Brookline, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 356 days.

(21) Appl. No.: 09/589,935

(22) Filed: Jun. 7, 2000

(51) Int. Cl.[7] .................................................. G09G 5/02
(52) U.S. Cl. ........................................ 345/604; 345/601
(58) Field of Search ............................... 345/600–610; 358/524, 525

(56) References Cited

U.S. PATENT DOCUMENTS

| | | | | |
|---|---|---|---|---|
| 4,275,413 A | * | 6/1981 | Sakamoto et al. | 358/525 |
| 4,334,240 A | * | 6/1982 | Franklin | 358/525 |
| 4,477,833 A | * | 10/1984 | Clark et al. | 358/524 |
| 4,511,989 A | * | 4/1985 | Sakamoto | 345/603 |
| 4,839,721 A | * | 6/1989 | Abdulwahab et al. | 358/518 |
| 5,241,373 A | * | 8/1993 | Kanamori et al. | 348/645 |
| 5,260,873 A | * | 11/1993 | Hishinuma | 345/11 |
| 5,272,468 A | * | 12/1993 | Read | 345/604 |
| 5,321,797 A | * | 6/1994 | Morton | 345/604 |
| 5,331,439 A | * | 7/1994 | Bachar | 358/500 |
| 5,412,491 A | * | 5/1995 | Bachar | 358/500 |
| 5,479,272 A | * | 12/1995 | Saito | 358/518 |
| 5,568,596 A | * | 10/1996 | Cawley | 345/603 |
| 5,579,031 A | * | 11/1996 | Liang | 345/604 |
| 5,581,376 A | * | 12/1996 | Harrington | 358/518 |
| 5,594,557 A | * | 1/1997 | Rolleston et al. | 345/603 |
| 5,596,510 A | * | 1/1997 | Boenke | 358/525 |
| 5,625,378 A | * | 4/1997 | Wan et al. | 345/600 |
| 5,652,831 A | * | 7/1997 | Huang et al. | 345/604 |
| 5,739,927 A | * | 4/1998 | Balasubramanian et al. | 358/518 |
| 5,748,176 A | * | 5/1998 | Gondek | 345/600 |
| 5,768,410 A | * | 6/1998 | Ohta et al. | 382/162 |
| 5,809,181 A | * | 9/1998 | Metcalfe | 358/525 |
| 5,809,213 A | * | 9/1998 | Bhattacharjya | 358/1.6 |
| 5,894,300 A | * | 4/1999 | Takizawa | 358/525 |
| 5,896,122 A | * | 4/1999 | MacDonald et al. | 345/602 |
| 5,900,862 A | * | 5/1999 | Silverbrook et al. | 345/603 |
| 5,943,058 A | * | 8/1999 | Nagy | 345/582 |
| 5,982,990 A | * | 11/1999 | Gondek | 358/1.9 |
| 5,991,056 A | * | 11/1999 | Takamori | 358/518 |
| 6,023,351 A | * | 2/2000 | Newman | 345/604 |
| 6,137,495 A | * | 10/2000 | Gondek | 345/600 |
| 6,232,954 B1 | * | 5/2001 | Rozzi | 345/601 |
| 6,332,045 B1 | * | 12/2001 | Sawada et al. | 382/261 |
| 6,340,975 B2 | * | 1/2002 | Marsden et al. | 345/590 |
| 6,373,980 B2 | * | 4/2002 | Ohta | 382/167 |
| 6,381,037 B1 | * | 4/2002 | Balasubramanian et al. | 358/3.23 |
| 6,384,838 B1 | * | 5/2002 | Hannah | 345/601 |
| 6,389,161 B1 | * | 5/2002 | Krabbenhoft | 358/518 |
| 6,411,304 B1 | * | 6/2002 | Semba et al. | 348/645 |

* cited by examiner

*Primary Examiner*—Michael Razavi
*Assistant Examiner*—Ryan Yang
(74) *Attorney, Agent, or Firm*—Lahive & Cockfield, LLP

(57) ABSTRACT

A signal conversion system parses a multi-dimensional input signal into most-significant and least-significant portions. The most-significant portions are used as an index to a look-up-table. Stored in each entry of the look-up-table is a base value and multi-dimensional differential values. The system generates an output representation of the signal by combining the corresponding base value with interpolated differences determined by interpolation performed using the differential values and the least-significant portions. Interpolation error is decreased by storing intermediate differential values. Output processing is used for linearization.

12 Claims, 3 Drawing Sheets

PROCESSING SYSTEM AND METHOD USING A MULTI-DIMENSIONAL LOOK-UP TABLE

TECHNICAL FIELD

The present invention relates generally to data processing systems and more specifically to systems and methods for using look-up tables to convert data from one format to another.

BACKGROUND OF THE INVENTION

Data processing equipment, such as computers, digital scanners, and printers, typically represent images of physical objects through signals or data in predetermined formats. For example, an image of a physical object is often processed for display on a monitor by representing the image as a map of pixels. Each pixel has associated by intensity levels of red (R), green (G), and blue (B) components. For various reasons, such an "RGB" representation of the image works well for displaying images on a computer display monitor. However, other representations may be better suited for use with other types of output devices. For example, color printers commonly use signals in a "CMYK" format, which provides separate intensity values for cyan (C), magenta (M), yellow (Y) and black (K (for "key")).

Since it is desirable to be able to both display an image on a computer monitor and print the image using the same computer system, schemes have been devised for converting images from one format to another (i.e. color conversion schemes). Color conversion is only one aspect of a more generic problem that is often addressed by data processing equipment: transforming one type of signal or data to another type of signal or data. Transformation is traditionally performed using two techniques, either alone or in combination. The first technique is a computational methodology that uses computational transformations and the second is a lookup table methodology that at least one "look-up table" holding conversion values.

Computational transformations are widely known and are well suited where mathematical relationships can be readily applied to mappings. For example, simple computational operations on a Celsius temperature reading will yield a corresponding Fahrenheit temperature reading (e.g. $t_f=9/5 t_c+32°$ F.).

Look-up tables are extremely helpful where a discrete set of inputs maps to a discrete set of outputs or where there is no readily processed mathematical relationship that corresponds to the desired mapping. For instance, one might use a look-up table to convert part numbers from one manufacturer to equivalent part numbers from another manufacturer. Through interpolation, lookup tables may also be used to map information that is continuous rather than discrete. The lookup table may specify discrete reference points to which interpolation may be applied to obtain the converted value. For example, conversion of distances from metric to English units can be performed trivially using linear interpolation or extrapolation from a look-up table having only two data points.

Traditionally, in situations where both computational and look-up table approaches are available to accomplish a transformation, there has been a tradeoff in determining which to use. Computationally intense approaches consume relatively more processing resources than approaches based on look-up tables. However, where the mappings involved are not limited to linear relationships, very large amounts of memory are needed for a look-up table to provide accurate and precise transformations over a wide range of inputs. It is common to use look-up tables of more than two dimensions. As might be expected, implementation of such multi-dimensional look-up tables can easily call for large amounts of memory. Accessing a multi-dimensional look-up table traditionally involves accessing a number of entries surrounding an index pointer to obtain point values, and then interpolating such surrounding point values using some form of linear interpolation. For example, tetrahedral interpretation uses four surrounding points, and tri-linear interpretation uses eight surrounding points.

When it is necessary to access a significant number of points that are not sequential or closely adjacent in the space defined by the look-up table's structure, significant computational overhead is incurred. The impact of such multi-dimensional table processing is exacerbated, beyond the generalized interpolation overhead, in systems having a heavily "pipelined" memory architecture. Sometimes, increasing a table size sufficiently to avoid interpolation altogether, or at least permit the use of simple linear interpolation, imposes an unacceptable memory requirement. Look-up table memory requirements grow exponentially with the dimensionality of the table, so doubling the linear size (number of entries) along each of the dimensions of a three-dimensional look-up table increases the memory requirements by a factor of eight.

Image processing applications involve great amounts of data that often need to be processed very quickly. For example, raster-printing methods require image data to be processed quickly enough to have print data for a portion of a page ready when the print head of the print engine reaches the corresponding portion on the paper. Real-time video display requires pixel information to be processed much more quickly. Accordingly, image processing applications have tested the limits of known systems and methods for transformation using computational and look-up table techniques.

SUMMARY OF THE INVENTION

The system and method of the present invention provides additional processing capacity to conventional signal and data processing equipment by using a look-up table that includes both sampled data entries and difference values (also known as "differentials"). The difference values correspond to the rates of change from each table entry and its neighbors in the table.

Also in accordance with the present invention, an interpolated table value is determined using a single sampled data entry and difference values corresponding to that entry.

In one aspect of the invention, the difference values correspond to first-order differences.

In another aspect of the invention, the table maps between RGB values and CMYK values.

In still another aspect of the invention, the contents of a computer-readable medium causes a computer to perform interpolation using a look-up table having sampled data entries and difference values corresponding thereto.

In yet another aspect of the invention, a computer-readable memory device is encoded with a data structure that includes a lookup table with sampled data entries and corresponding difference values, the look-up table configured to provide interpolated output in response to application of selected data entries and difference values to an interpolation engine.

In accordance with an additional aspect of the present invention, a method converts a red, green, blue (RGB) color value into a cyan, magenta, yellow, key (CMYK) color value. In this method the nearest sampled RGB point to the input RGB point is found and the RGB components of the distance from the sampled point to the input point are calculated. The table entry for the sampled RGB point contains a base value for a selected one of the cyan, magenta, yellow or key output as well as difference values for that output primary along each of the RGB input primary axes. An interpolated value is determined for the selected primary using the base value and the summed products of the difference values in the RGB axes and the distance from the input RGB point to the sampled RGB point. The interpolated value becomes the output value for the selected primary in the cyan, magenta, yellow or key value. Each output primary is determined in this manner.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE INVENTION

The illustrative embodiment of the present invention provides an approach to converting a red, green, blue (RGB) value into a cyan, magenta, yellow, key (CMYK) value. The illustrative embodiment uses a multidimensional lookup table to assist in performing the color conversion. The multidimensional lookup table is optimized so as to not contain an excessive amount of data. Each entry contains a base value associated with a given input RGB value. Each entry also includes slopes that identify a rate of change of a primary relative to a rate of change in the red, green and blue components, respectively. This multidimensional lookup table does not store a large number of sampled values, as found in some conventional systems. Instead, the illustrative embodiment uses a simplifying assumption to save on memory space but still provide a quick and accurate conversion of a RGB value into a CMYK value.

Figure 1:
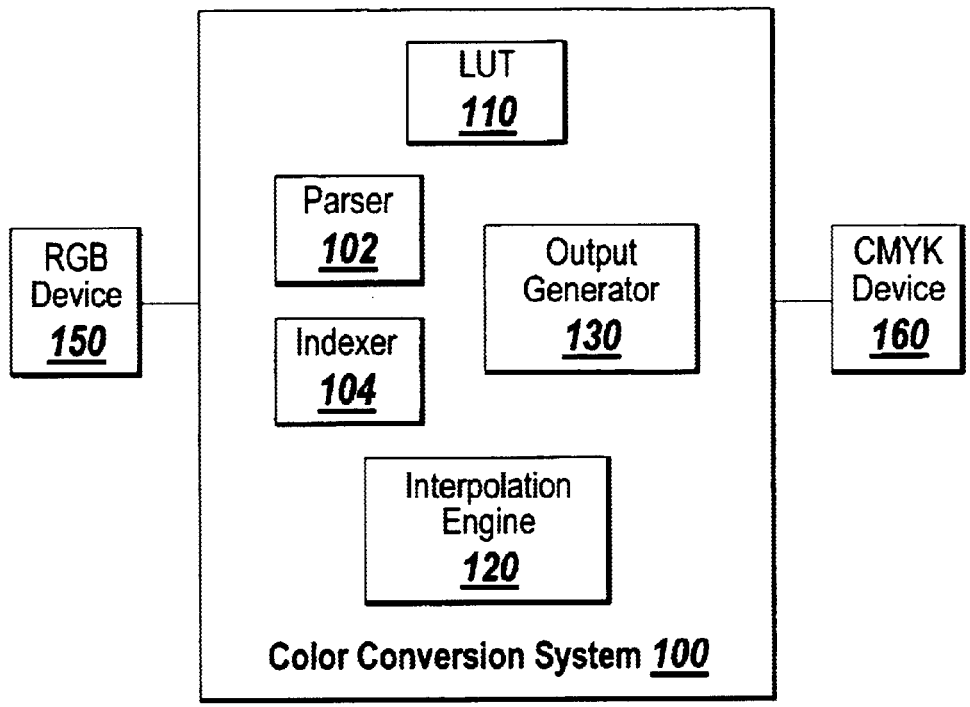
FIG. 1 is a block diagram of a color conversion system in accordance with the present invention.

FIG. 1 depicts a color conversion system 100 for converting data in an RGB format to data in a CMYK format in accordance with the illustrative embodiment of the present invention. The present invention is not limited to methods and systems for converting RGB data to CMYK data. Numerous other conversions and transformations may be performed by alternate embodiments of the present invention. Color conversion system 100 receives input signals from an RGB device 150, such as a conventional digital scanner, and provides output to a CMYK device 160, for example a conventional printer. The color conversion system 100 includes look-up tables (LUTs) 110 and an interpolation engine 120.

The lookup tables 110 include an input lookup table, an output lookup table, and a three-dimensional lookup table. The three-dimensional lookup table is used in color conversion calculations, as will be discussed below. The input lookup table converts input data into a space that is roughly linear with human visual sensitivity. For example, a scanner may have different sensitivity than the human eye. Red values of 5 and 10 from the scanner (in a RGB color encoding) might be indistinguishable to the human eye, whereas values of 250 and 251 from the scanner may be readily distinguishable by the human eye. The input lookup table may convert the 5 and 10 values to values that are one unit apart and may convert the 250 and 251 values into values that are two units apart.

The output lookup table is used to convert from a color space that is roughly linear with the human eye to a color space that is appropriate for the CMYK output device 160 for example, cyan values at 5 and 6 may be converted to cyan values of 5 and 10. The interpolation engine 120 performs interpolation as will be described in more detail below. Other components of note include a parser 102, an indexer 104, and an output generator 130. The parser 102 parses the RGB input provided by the RGB device 150 into a form that is usable by the other components of the color conversion systems 100. The indexer generates an index into the three-dimensional lookup table 110 from the parsed RGB input. The output generator 130 generates the CMYK output, as will be described in more detail below. Those skilled in the art will appreciate that the parser 102, indexer 104, interpolation 120 and output generator 130 may be implemented as software components in some embodiments of the present invention. These software components may execute on a microprocessor such as a reduced instruction set code (RISC) microprocessor. The microprocessor may be part of a microcontroller that is situated on one of the devices 150 or 160 or, alternatively, situated on a separate device that acts as an intermediary between the RGB device 150 and the CMYK device 160. Those skilled in the art will appreciate that the parser, 102, indexer 104, interpolation engine 120 and output generator 130 need not be separate code modules but rather may be integrated into a single package or into combined packages that provide multiple functionalities. For example, the parser 102 and the indexer 104 may be incorporated into a single module. Those skilled in the art will also appreciate that these components may be implemented in whole or in part in hardware or firmware.

Those skilled in the art will also appreciate that the lookup table 110 need not be implemented as a single table but rather may be implemented as multiple tables.

Figure 2:
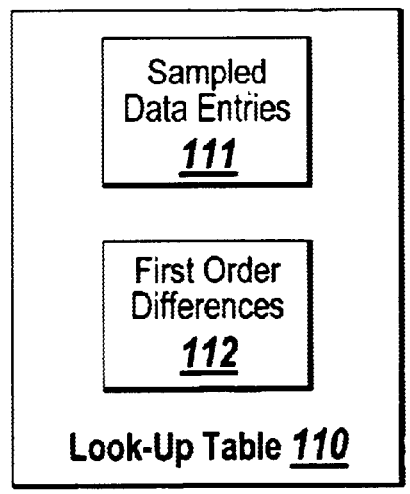
FIG. 2 is a block diagram of the look-up table illustrated in FIG. 1.

As shown in FIG. 2, the primary components the three-dimensional look-up table 110 are illustrated. In a preferred embodiment, look-up table 110 includes sampled data entries 111 and first order differences 112. Sampled data entries 111 are CMYK values that correspond to certain selected RGB values. As one example, assume that RGB values are encoded in 24-bit words, with eight bits each encoding the red, green, and blue intensities respectively. The CMYK values are encoded by 32-bit words, with eight bits each encoding cyan, magenta, yellow and black primaries. In such an example, a 24-bit RGB input contains the bits for a table address, and the table entry at that address contains the 32-bit CMYK value (i.e., a sampled data entry) corresponding approximately to the RGB input. The sampled data entry stored in the table may be determined either from known mathematical relationships between the RGB and CMYK color spaces or empirically. For example, one such mathematical relationship is:

Cyan=255−red

Magenta=255−green

Yellow=255−blue

Black=minimum of (Cyan, Magenta, Yellow)

In the illustrative embodiment, the C, M, Y, and K primaries of each sampled data entry are stored as separate eight-bit entries, but it should be appreciated that the values may also be encoded and stored together in some embodiments of the present invention. For example, a single 32-bit word may be used to store all four component values with the first eight bits encoding the C component, the next eight bits encoding the M component, the next eight bits encoding the Y component and the last eight bits encoding the K component. Those skilled in the art will appreciate that the data may be encoded in different formats. The data need not be encoded as 24 bit words or as 32 bit words as described above.

The first order differences 112 describe the rate of change of a vertex color value along any one of the dimensions of table 110, where each of the dimensions is associated with a given color component (red, green or blue) from the RGB color space. In other words, the first order differences 112 are the slopes of the lines extending from the sampled data entry to a next vertex in the same space. For example, consider a C component vertex color value. Three first order differences 112 are associated with the C component vertex color value. The three differences correspond to the partial derivatives dC/dR, dC/dG, and dC/dB (wherein R refers to the red component, G refers to the green component and B refers to the blue component). In the illustrative embodiment, the sampled data entries and the differences, though functionally separate as shown in FIG. 2, are logically stored adjacent to one another by packing 8-bit values for each into a single 32-bit word. Since these values are typically accessed at the same time, such adjacent storage enhances processing efficiency.

It should be noted that the actual slope between one color value entry and the next along a particular dimension is not necessarily constant, but may vary. Such variation may be accounted for by use of difference values that are not constants but that vary with distance from each color value entry; the stored differences would, therefore, represent higher-order differences than the linear model described above. However, in the illustrative embodiment, it is found that for many applications, the benefits from such increased interpolation accuracy do not justify the additional memory and processing costs associated with such higher order terms.

As further described below, some of the potential inaccuracy resulting from use of first-order differences only may be ameliorated by minimal additional processing. For instance, selection of a reference location at the center of a cube formed between a base value and the seven nearest neighbors having equal or greater values in each dimension can help to reduce errors introduced by use of only first-order differences. For example, in an alternative embodiment the value actually stored at a location (X,Y,Z) in lookup table 110 corresponds to the value of the output function at (X+d, Y+d, Z+d) where d represents half the distance between adjacent vertex points in lookup table 110. In this embodiment, the slopes (i.e. partial derivatives) of the output function stored at a location (X,Y,Z) are set to correspond to the slopes of the output function at (X+d, Y+d,Z+d). This formulation has the advantage of interpolating over at maximum half the distance of the original formulation.

Figure 3:
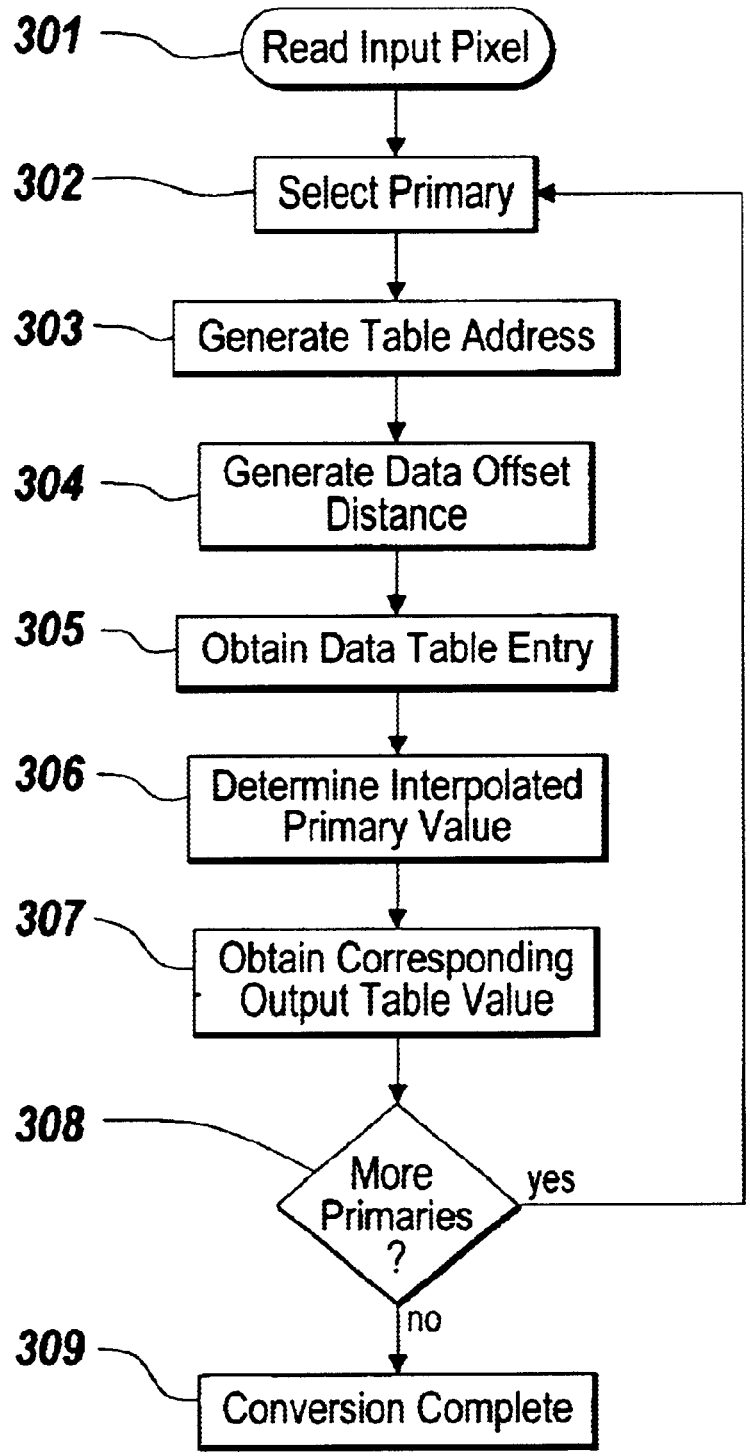
FIG. 3 is a flow diagram of interpolation processing in accordance with the present invention.

FIG. 3 shows a flow diagram of the processing performed by the illustrative embodiment. Processing commences by receiving an input pixel from the RGB color space for conversion (step 301 in FIG. 3). One of the primaries from the output color space is then selected 302 for processing. For example, by convention the Cyan primary may be selected first, then Magenta, then Yellow, and then Black. Next, a table address or index for that primary is generated 303 by combining the high (most significant) four bits for each input color. In the illustrative embodiment, separate tables are used for each desired output component (i.e., cyan, magenta, yellow, black); in an alternate embodiment a single table is employed, and two prefix bits are used to designate the desired output color for which an entry is desired, e.g., 00 for cyan, 01 for magenta, 10 for yellow, and 11 for black. Although this addressing scheme is found to be particularly advantageous when used with heavily pipelined memory architectures that might suffer degraded performance with numerous 32-bit access operations, those skilled in the art will recognize that numerous other addressing schemes could also be used.

Consider a three-dimensional lookup table 110 having table entries, with 32 bits per entry, stored in linear order for the Cyan output primary. A 16×16×16 table has 4096 32-bit table entries. Each entry corresponds to one of 4096 sub-cubes in a RGB color space. Each entry has four sets of 8-bit data: a base value and a slope in each of the Red, Green and Blue dimensions. The index into the lookup table is formed by the indexer 104 (FIG. 1) from the high four bits for each of the R, G, and B input values, such that the index is a 12-bit value given as:

$R_h G_h B_h$ where $R_h$ represents the four highest-order bits of the R input value, $G_h$ represents that four highest-order bits of the G input value, and $B_h$ represents the four highest order bits of the B input value. In the illustrative embodiment, the parser 102 parses these high-order bits from the applied RGB input value, and indexer 104 combines the high order bits to form the index. Alternatively, the same index may be represented mathematically as:

$256*R_h+16*G_h+B_h$

The least significant (or "low") four bits of each input color component (R,G,B) are used to generate a data offset distance from the selected table entry, or vertex (see 304 in FIG. 3). The data offset distance is used by the interpolation engine 120 in performing the interpolation.

The table address generated in step 303 is used to obtain the table entry stored at that address (step 305 in FIG. 3). As mentioned above, this table entry includes not only the sampled Cyan value, but also the first-order differences dC/dR, dC/dG, and dC/dB. The sampled value and the first-order differences are all represented by eight bit values. The sampled value represents a center point in the sub-cube.

The slopes are pre-calculated by averaging the slopes along the four appropriate edges of the sub-cube. Each slope is multiplied by 32 to preserve 5 bits of the fractional component of the slope. The resulting value is converted into an integer. The slope value is limited to a rage of +128 to −127 corresponding to slopes in the range of −4 to +3$\frac{31}{32}$. 128 is then added to the slope value to produce a final slope value in the range between 0 and 255.

The interpolated Cyan value is determined (in step 306 of FIG. 3) in a linear manner as:

$$\text{Cyan} = C_b + ((R_1-8)*(R_s-128) + (G_1-128)*(G_s-128) + (B_1-8)*(B_s-128))/32$$

where $C_b$=cyan sampled base value from the table;
$R_1$=lower order 4 bits of red value;
$R_s$=slope for red;
$G_1$=lower order 4 bits of green value;
$G_s$=slope for green;
$B_1$=lower order 4 bits of blue values; and
$B_s$=slope for blue.

Eight is subtracted from the lower order bits $R_1$, G and $B_1$ because the sampled values are at (8,8,8) in the respective sub-cubes. A value of 128 is subtracted from the slope values to obtain positive and negative slopes from the unsigned integer slope values in the table. The division by 32 removes fractional components.

Figure 4:
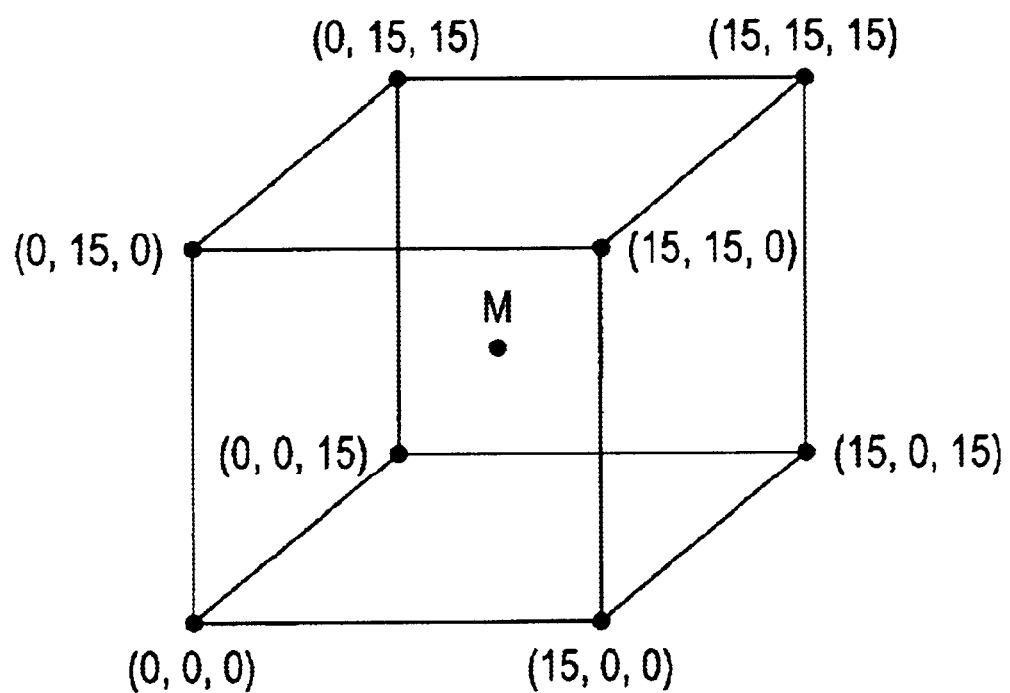
FIG. 4 depicts an example of a visualization of a cube of sampled data entries.

The low order bits of the red component are referred to as (R'–R) because they correspond to a difference between the red component of the table entry address (R) and the actual input red component (R'). Thus, viewing the look-up table 110 as corresponding to a three dimensional space in which lower values are toward the front lower left of a cube and higher values are toward the rear upper right, the above equation assumes that the vertex pixel is at the lower left and that the offsets provided by the lower four bits run from 0 to 15 (see FIG. 4). This assumption results in the potential for interpolation to be made for distances up to 15 units distant from the vertex. While this assumption is useful because it allows simple and clear explanation of the interpolation taking place, in one embodiment Cval is taken based on the center of a cube (see point M in FIG. 4) defined by the corresponding table address and the nearest seven addresses toward upper rear right thereof. Specifically, such a "centered" Cval may be obtained by averaging the sampled Cvals at each of the eight vertices surrounding the center. By using such a centered Cval, the offset values run from –8 to +7, and the interpolation is made based on, at most, a distance in any one dimension of 8 units from Cval rather than 15. As higher order interpolation terms are not used in the illustrative embodiment, errors introduced by using first-order differences are proportional to the squares, cubes, and higher level exponents of (R'–R), (G'–G), and (B'–B). Accordingly, by using a centered Cval that cuts the maximum distance for interpolation from a sampled value in half, the maximum error caused by ignoring these higher order terms may be reduced by ¼, ⅛ and so forth, respectively.

Along with using a centered Cval, corresponding averaged partial derivatives are also used. Again using a cube to illustrate the space of table 110, the averaged partial derivative for red may be obtained by averaging the four pairs of vertices in the cube for which the green and blue values do not change. Each of those four pairs provides a first order difference value for cyan, and those four cyan differences are then averaged to yield a "centered" dC/dR value corresponding to the centered Cval.

Once the interpolated C' value is determined in step 306 of FIG. 3, it is used as an index into a conventional one-dimensional output table to obtain an output value as has been described above (step 307 in FIG. 3), again using conventional linear interpolation as necessary. The use of such a one-dimensional output lookup table is used to convert from a color space that is roughly linear with the human eye to a color space that is appropriate for the CMYK output device 160.

Once the output value is thus obtained in step 307 of FIG. 3, a check is made to determine whether additional primaries (e.g., magenta, yellow, black) still need to be processed (step 308 in FIG. 3). If there are additional primaries to be processed, processing returns to step 302 where the next primary is selected and processing continues for that primary as described above. If there are no additional primaries that require processing, conversion is complete step 309 in FIG. 3.

An example is helpful to illustrate operation of the illustrative embodiment. In this example, each 32-bit table entry in the lookup table 110 contains four eight-bit bytes. The first (highest-order) byte represents the "base" value ("$V_1$") of the output function for that table entry, for instance the "Cyan" output function. The three following bytes represent the output function derivatives (i.e., slopes) along the R, G, and B axes; those slope values are referred to herein for discussion purposes as $R_s$, $G_s$, and $B_s$, respectively.

As a numerical example, assume that the RGB input triplet has value of (124, 49, 210). $R_h G_h B_h$ is (7, 3, 13) and $R_l G_l B_l$ is (12, 1, 2). Assume that the table entry at location 1853 (=7*256+3*16+13) in the lookup table for cyan primary holds $V_1$, $R_S$, $G_S$, $B_S$ values of (134, 81, 113, 137). The Cyan output value is then determined to be:

$$\text{Cyan} = 134 + \{(12-8)*(81-128) + (1-8)*(113-128) + (2-8)*(137-128)\}/32 = 130$$

The magenta, yellow, and black values are similarly derived from the corresponding table entries.

It should be recognized that numerous operations other than color conversion can be implemented as described herein, for example an operation where it is necessary to determine the value of a function of multiple variables where it is difficult or time-consuming to compute the function value analytically but desirable to precompute the function value at some number of equally-spaced points and interpolate between those points. Such an operation is computing surface reflectivity at arbitrary orientations in three spaces.

From the above description, it will be apparent that the invention disclosed herein provides a novel and advantageous system and method of processing using look-up tables with difference entries. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. In an electronic device, a method of converting a red, green, blue (ROB) color value into a cyan, magenta, yellow, key (CMYK) color value, comprising the steps of:

for a selected one of the cyan, magenta, yellow or key primaries, obtaining a base value for the selected primary corresponding to an approximation of the RGB color value that differs from the RGB color value by a given amount;

determining an interpolated value for the selected primary by interpolating from the base value for the selected primary using information that identifies a rate of change of the selected primary relative to a rate of change of the respective red, green and blue components; and using the interpolated value as a value for the selected primary in the CMYK value.

2. The method of claim 1, wherein the method further comprises the steps of repeating the steps of the method for each of the primaries to which the steps have not been applied.

3. The method of claim 1, wherein the electronic device includes a storage and the information that identifies the rate of change is stored in the storage.

4. The method of claim 3, wherein the storage also stores the base value.

5. The method of claim 4, wherein the information that identifies the rate of change and the base value are stored in at least one lookup table.

6. The method of claim 5 comprising the step of indexing the lookup table with bits from the RGB value to access the base value and the information that identifies the rate of change in the lookup table.

7. A computer-readable medium for use in an electronic device, said medium holding instructions for performing a method of converting a red, green, blue (RGB) color value into a cyan, magenta, yellow, key (CMYK) color value, comprising the steps of;

for a selected one of the cyan, magenta, yellow or key primaries, obtaining a base value for the selected primary corresponding to an approximation of the RGB color value that differs from the RGB value by a given amount.

determining an interpolated value for the selected primary by interpolating from the base values for the selected primary using information that identifies a rate of change of the selected primary relative to a rate of change of the respective red, green and blue components; and using the interpolated value as a value for the selected primary in the CMYK value.

8. The computer readable medium of claim 7, wherein the method further comprises the steps of repeating the steps of the method for each of the primaries to which the steps have not been applied.

9. The computer readable medium of claim 7, wherein the electronic device includes a storage and the information that identifies the rate of change is stored in the storage.

10. The computer readable medium of claim 9, wherein the storage also stores the base value.

11. The computer readable medium of claim 10, wherein the information that identifies the rate of change and the base value are stored in at least one lookup table.

12. The computer readable medium of claim 11, further comprising the step of indexing the lookup table with bits from the RGB value to access the base value and the information that identifies the rate of change in the lookup table.

* * * * *